March 6, 1956　　　G. R. ROSS　　　2,737,575
RETRACTIBLE VEHICLE LAMP
Filed March 16, 1953　　　2 Sheets-Sheet 1

Gerald Ray Ross
INVENTOR.

BY *Clarence A. O'Brien
and Harvey B. Jacobson*
Attorneys

March 6, 1956  G. R. ROSS  2,737,575
RETRACTIBLE VEHICLE LAMP
Filed March 16, 1953  2 Sheets-Sheet 2

Gerald Ray Ross
INVENTOR.

BY Clarence A. O'Brien
and Harvey B. Jacobson
Attorneys

United States Patent Office 2,737,575
Patented Mar. 6, 1956

2,737,575

RETRACTIBLE VEHICLE LAMP

Gerald Ray Ross, Junction City, Oreg.

Application March 16, 1953, Serial No. 342,306

4 Claims. (Cl. 240—7.1)

This invention relates to illuminating lamps for automotive vehicles and more particularly to a retractible fog light assembly adapted to be suspended from the bumper brackets of an automobile.

The primary object of this invention is to provide a mounting for fog lights on an automobile which will suspend the lamps at a point very close to the highway while also providing means for rotating the lights upwardly so as not to substantially decrease road clearance of the vehicle when the fog lights are secured The construction of this invention features the use of an elongated supporting bar connected to a pair of lamps by means of universal joints. Means are connected to an operating arm secured to the supporting bar and operated by handles on the dash-board which permit the supporting bar to be rotated from a locked operating position to a rotated stowed position. A spring pressed locking plate which engages the flat sides of an annular straight cam end on the supporting bar provides the means for locking the device in either of the two positions.

Still further objects of the invention reside in the provision of a retractible fog light for an automotive vehicle that is strong and durable, simple in construction and manufacture, capable of being installed on various makes and models of automotive vehicles, which substantially reduces glare by projecting the light rays at a point very close to the highway, and which is relatively inexpensive to produce.

These, together with the various ancillary objects and features of the invention which will become apparent as the following description proceeds, are attained by this vehicle fog light mounting, a preferred embodiment of which has been illustrated in the accompanying drawings, by way of example only, wherein.

Figure 1:
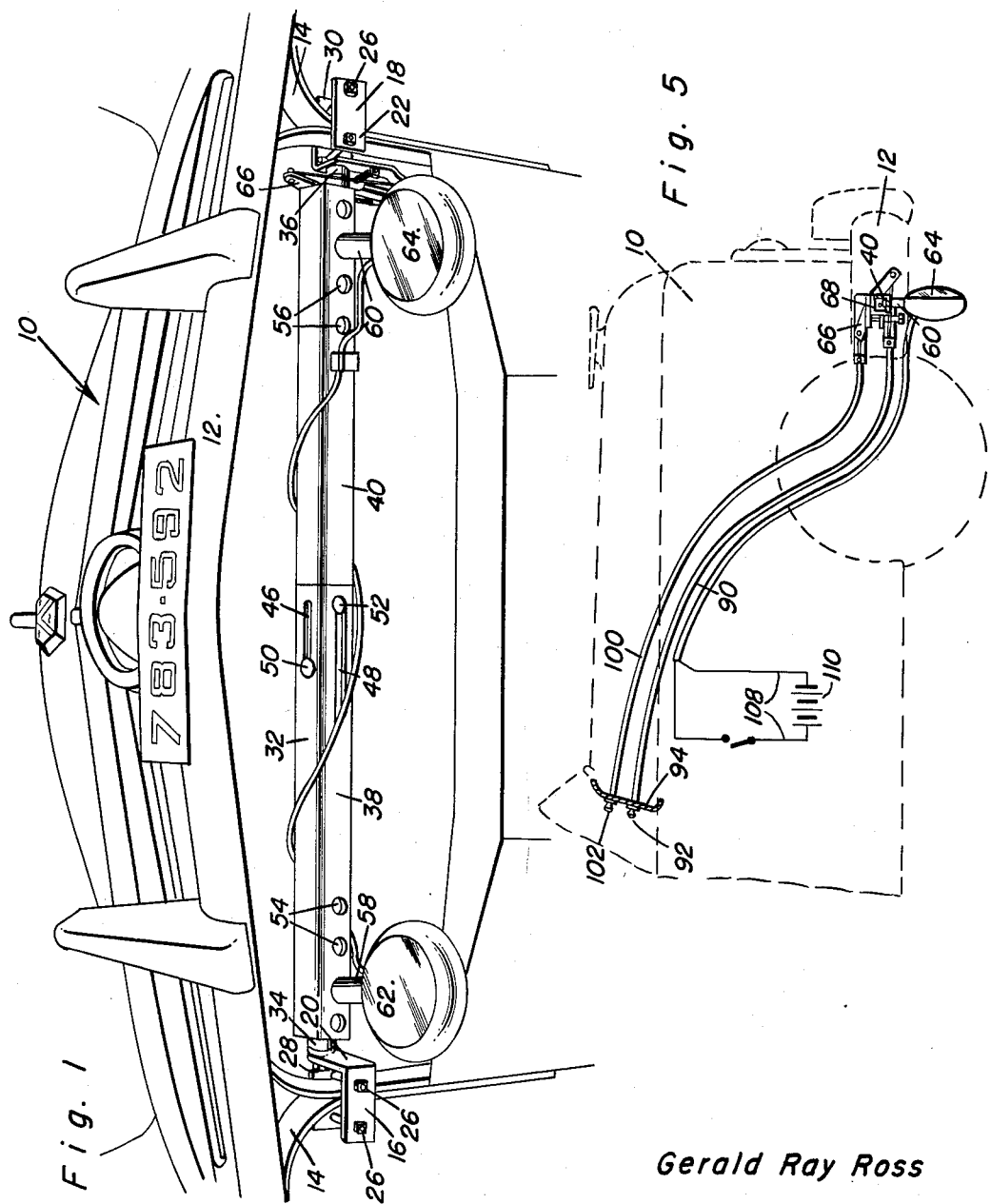
Figure 1 is a perspective view illustrating the manner in which the retractible fog lights are attached to the bumper brackets of a motor vehicle.

With continuing reference to the accompanying drawings wherein like reference numerals designate similar parts throughout the various views, reference numeral 10 generally designates any conventional make or model of automotive vehicle which is provided with a bumper 12 mounted on brackets 14. The retractible fog lights, comprising the present invention, are secured to the vehicle by means of clamps 16 and 18 including substantially L-shaped plates 20 and 22 having suitable bolts 26 extending therethrough, the bolts 26 also extend through clamping plates 28 and 30 supported above the brackets 14, the L-shaped clamping members 20 and 22 extending beneath the brackets 14. Clamps 16 and 18 are secured to the supporting bar 32 of this assembly by means of universal joints 34 and 36 consisting of a ball and socket.

The supporting bar 32 is formed from two half portions 38 and 40. Welded to the portion 40 is an angular plate 42 having apertures 44 therethrough in alignment with the slots 46 and 48 in the section 38 of the supporting bar 32. Bolts 50 and 52 extend through the holes 44 and the aligned slots 46 and 48 thus enabling the supporting bar sections 38 and 40 to be telescopically adjustable. A plurality of apertures 54 are provided in the supporting bar section 38 and other apertures 56 are provided in the supporting bar section 40 within which cylinders 58 and 60 providing mounting means for fog lamps 62 and 64 may extend. Any suitable or convenient means may be used for holding the cylinders 58 and 60 to the supporting bar 32 and the electrical conductors connecting the lamps to the battery of the vehicle may extend upwardly through the cylinders 58 and 60 and along the supporting bar 32 prior to being passed upwardly to the battery.

Figure 2:
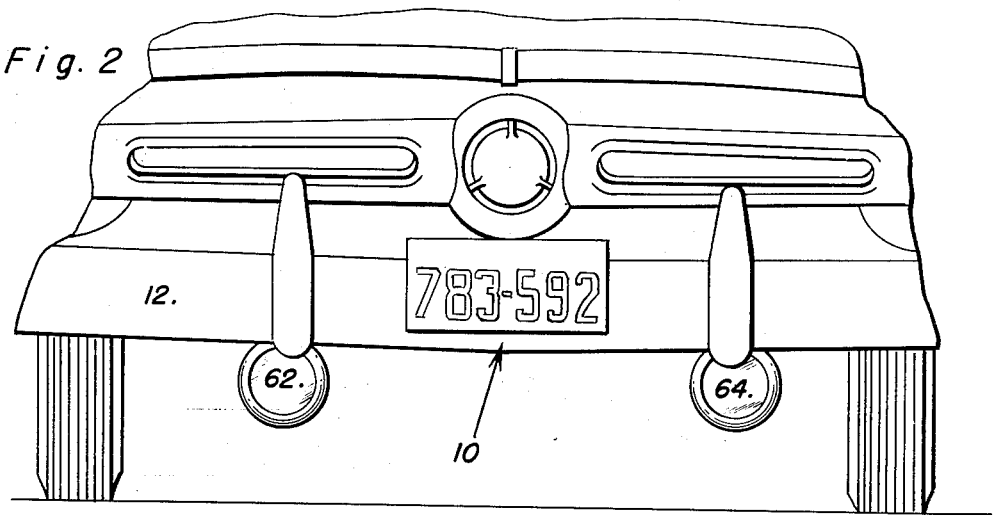
Figure 2 is a front elevational view of a vehicle having the fog lights installed thereon, the fog lights being shown in their operating position.
Figure 4:
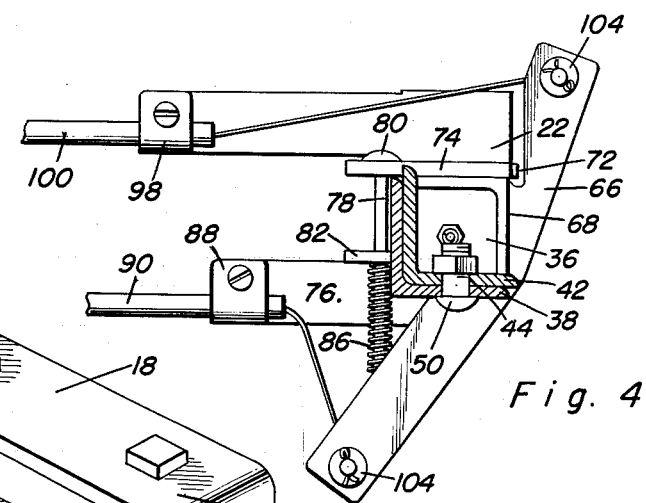
Figure 4 is a sectional detail view illustrating the construction of the operating arm and the operating means for actuating the operating arm to rotate the supporting bar; and, Figure 5 is a diagramatic view illustrating the operating means for actuating the retractible vehicle fog lights.
Figure 3:
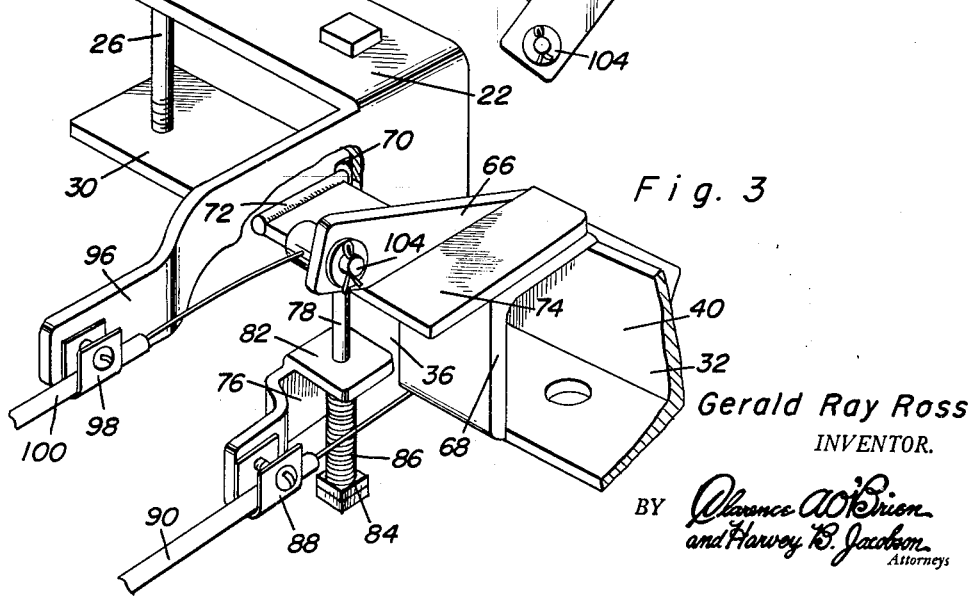
Figure 3 is a perspective view illustrating a mounting clamp and also illustrating the means for lockingly holding the supporting bar to which the lamps are installed in its selected position.

An operating arm 66 is welded to the end of the supporting bar section 40 as is an angle-shaped cam 68. Secured to the angle clamp member 22 is a knuckle 70 for a pintle 72 having a substantially L-shaped locking plate 74 attached thereto, the pintle 72 and the knuckle 70 providing means for pivotally mounting the locking plate 74. Extending from the angle clamping member 22 is a lower guide plate 76. The rod 78 provided with a head 80 extends through the locking plate 74 and through a lug 82 extending from the guide plate 76 and is provided with nuts 84 on its other end for retaining a coil spring 86 on the rod 78, the coil spring 86 biasing the nuts 84 and the lug 82. The lower guide plate has atached thereto a lower guide bracket 88 for supporting a flexible cable 90 connecting to a handle 92 mounted on the dashboard 94 of the vehicle 10. An upper guide plate 96 supports an upper guide bracket 98 providing a support for an upper actuating cable 100 terminally attached to a handle 102 on the dashboard 94 and to one end of the operating arm 66, the cable 90 being attached to the other end of the operating arm 66. Rotating bearing cylinders such as indicated at 104 provide the means for connecting the cables 90 and 100 to the operating arm 66. With the lamps 62 and 64 in the lowered position as is shown in Figures 2 and 3 it is merely necessary to pull upon the handle 92 to pull the cable 90 and hence the lower end of the operating arm 66. This will cause rotation of the supporting bar and cause the angle cam 68 to press upwardly against the locking plate 74 to compress the spring 86. Since the angle cam 68 is welded to the bar section 40, when the bar section 40 is rotated, the apex of the angle cam 68 will bear against the locking plate 74. When the cable 90 has been fully actuated the action of the spring 86 and locking plate 74 will by engagement with the angle cam 68 cause the supporting bar 32 to seat with the fog lamps 62 and 64 in a raised and retracted position as is shown in Figure 4. The locking plate 74 rests on the flat side of the angle cam 68 and resiliently holds the entire assembly in its selected position. The nuts 84 provide means for varying the compression on the spring 86 so as to enable the force applied on the handles 92 or 102 to be regulated. The cable 100 when pulled will cause the lamps 62 and 64 to be returned to the lowered position.

The lamps 62 and 64 are electrically operatively connected through conductors 108 to a battery 110 of the vehicle 10, the battery 110 serving as a source of electrical power for the lamps 62 and 64. A switch may be provided for controlling flow of power from the battery 110 to the lamps 62 and 64.

Since from the foregoing, the construction and advantages of these retractible vehicle lamps are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A fog light attachment for motor vehicles comprising a supporting bar, at least one illuminating lamp secured to said bar, means for selectively operatively electrically connecting said lamp to a source of electrical power, a pair of clamp members adjustably attached to said bar, an operating arm secured to said bar, and operating means for actuating said operating arm to rotate said bar secured thereto, an angle shape cam end on said bar, a locking plate pivotally secured to one of said clamp members for engagement with said cam end, a headed rod extending from said locking plate, a guide plate carried by said one clamp member, and spring means about said headed rod yieldingly engaging said guide plate to retain said locking plate against said cam and thereby holding said bar in an adjusted position.

2. A fog light attachment for motor vehicles comprising a supporting bar, at least one illuminating lamp secured to said bar, means for selectively operatively electrically connecting said lamp to a source of electrical power, a pair of clamp members adjustably attached to said bar, an operating arm secured to said bar, and operating means for actuating said operating arm to rotate said bar secured thereto, said clamp members being secured to said bar by means of universal joints, an angle shape cam end on said bar, a locking plate pivotally secured to one of said clamp members for engagement with said cam end, a headed rod extending from said locking plate, a guide plate carried by said one clamp member, and spring means about said headed rod yieldingly engaging said guide plate to retain said locking plate against said cam and thereby holding said bar in an adjusted position.

3. A fog light attachment for motor vehicles comprising a supporting bar, at least one illuminating lamp secured to said bar, means for selectively operatively electrically connecting said lamp to a source of electrical power, a pair of clamp members adjustably attached to said bar, an operating arm secured to said bar, and operating means for actuating said operating arm to rotate said bar secured thereto, an angle shape cam end on said bar, a locking plate pivotally secured to one of said clamp members for engagement with said cam end, a headed rod extending from said locking plate, a guide plate carried by said one clamp member, and spring means about said headed rod yieldingly engaging said guide plate to retain said locking plate against said cam end thereby holding said bar in an adjusted position, said operating means including flexible cables terminally connected to said operating arm and to operating handles on the dashboard of said vehicle, said guide plates supporting guide elements for a flexible cable.

4. A fog light attachment for motor vehicles comprising a supporting bar, at least one illuminating lamp secured to said bar, means for selectively operatively electrically connecting said lamp to a source of electrical power, a pair of clamp members adjustably attached to said bar, an operating arm secured to said bar, an angle shape cam end on said bar, a locking plate pivotally secured to one of said clamp members for engagement with said cam end, a headed rod extending from said locking plate, a guide plate carried by said one clamp member, and spring means about said headed rod biasing said guide plate to retain said locking plate against said cam end thereby holding said bar in an adjusted position, and means for adjusting the length of said supporting bar.

References Cited in the file of this patent

UNITED STATES PATENTS

| | | |
|---|---|---|
| 1,036,879 | Miner | Aug. 27, 1912 |
| 1,376,962 | Miller | May 3, 1921 |
| 1,520,551 | Raver | Dec. 23, 1924 |
| 1,543,159 | Hopkins | June 23, 1925 |
| 1,563,415 | Wilson | Dec. 1, 1925 |
| 1,600,716 | Cammann | Sept. 21, 1926 |
| 1,600,717 | Cammann | Sept. 21, 1926 |
| 1,634,043 | Pierce | June 28, 1927 |
| 1,703,256 | Bartschat | Feb. 26, 1929 |